US008042045B1

(12) United States Patent
Sullivan et al.

(10) Patent No.: US 8,042,045 B1
(45) Date of Patent: Oct. 18, 2011

(54) FULL TIME ON-SCREEN ASSISTANCE FOR VIDEO GAMES AND OTHER COMPUTER SOFTWARE

(75) Inventors: Michael G. Sullivan, Concord, NC (US); Michael Alan Gardner, Indian Trail, NC (US); Jason Merrill, Monroe, NC (US)

(73) Assignee: Bank of America Corporation, Charlotte, NC (US)

( * ) Notice: Subject to any disclaimer, the term of this patent is extended or adjusted under 35 U.S.C. 154(b) by 537 days.

(21) Appl. No.: 12/142,440

(22) Filed: Jun. 19, 2008

(51) Int. Cl.
*G06K 15/00* (2006.01)
*A63F 9/24* (2006.01)
(52) U.S. Cl. .......................................... 715/708; 463/31
(58) Field of Classification Search .......... 715/705–715, 715/721–726, 748–749, 854, 855; 704/270.1; 463/31, 42; 345/173; 705/42, 39
See application file for complete search history.

(56) References Cited

U.S. PATENT DOCUMENTS

| 7,806,318 | B1* | 10/2010 | Bowen et al. ................. 235/379 |
| 2002/0038289 | A1* | 3/2002 | Lawlor et al. ................... 705/42 |
| 2002/0165961 | A1* | 11/2002 | Everdell et al. ............... 709/225 |
| 2004/0031030 | A1* | 2/2004 | Kidder et al. ................. 717/172 |
| 2004/0215566 | A1* | 10/2004 | Meurer .......................... 705/43 |
| 2006/0128471 | A1* | 6/2006 | Willis et al. .................... 463/42 |
| 2007/0034680 | A1* | 2/2007 | Gomes ......................... 235/379 |
| 2008/0061128 | A1* | 3/2008 | Putman et al. ................ 235/379 |
| 2008/0223919 | A1* | 9/2008 | Shane et al. ................. 235/379 |
| 2009/0094036 | A1* | 4/2009 | Ehlen et al. ............... 704/270.1 |
| 2009/0209337 | A1* | 8/2009 | Vrignaud et al. .............. 463/31 |

\* cited by examiner

*Primary Examiner* — Steven Sax
(74) *Attorney, Agent, or Firm* — Michael A. Springs; Moore & Van Allen PLLC; Ryan P. Harris

(57) ABSTRACT

Help implementation feature for video games. A two-tiered approach for offering guidance and assistance to the user of a computer software program. Event-generated help is activated when the user first initiates an event within the video game software program. Context-sensitive help is always available to the user but remains inactive until help is requested by the user. The event-generated help and context-sensitive help act in tandem to fully support the user at all times during game play. The invention can be implemented via a stand-alone computing system or such a system interconnected with other platforms or data stores by a network, such as a corporate intranet, a local area network, or the Internet.

28 Claims, 10 Drawing Sheets

202

204

502

504

FULL TIME ON-SCREEN ASSISTANCE FOR VIDEO GAMES AND OTHER COMPUTER SOFTWARE

RELATED APPLICATION

This application is related to the application entitled "A Synchronic Construct of Time Implemented Within Video Games and Other Computer Software", filed on even date herewith, by inventors Michael G. Sullivan, Michael Alan Gardner, and Jason Merrill, and assigned to Bank of America, the contents of which are fully incorporated herein by reference.

BACKGROUND

Engaging in a video game experience that is new to the user can be frustrating due to a lack of understanding of how the game operates and how to navigate therein. When a user decides to play a video game, the user is most often looking for a fun and enjoyable experience. If the user is faced with a video game software application that is difficult to learn and use, the user will not likely return to that game the next time he or she wishes to play.

Most video game software programs, like nearly all software programs, include a "help" feature. With traditional help features, the user must go to a menu and choose from a series of so-called drop down box choices (wherein each drop down box consists of a preset list of choices presented to the user) until he or she finally reaches the topic area in which the question lies, if the topic area is included in the help function at all. Further, this type of help must be initiated by the user, and the user must be able to recognize the appropriate terminology to find the desired help topic.

Context-sensitive help was later created to help users at the time they required the help during use of the software. This type of help function is form based and not task based. This means that the user must access the desired part of the software application via a menu and then choose a portion of the form they need help with. This help function therefore also presupposes user knowledge of the appropriate terminology.

When interne video gaming became popular, many games presented learning scenarios in which the user could play in a protected environment to learn how the game operated, and could then play the real game using what they had learned in the protected environment. With this kind of help function, the protected environment is separate from the real game environment, so that a user embedded in a real game may not have access to a help feature. Online gaming further introduced a chat feature so that users could receive live help from other users when they needed it. While this type of help feature is effective, it is also too resource intensive to be used for many software applications, such as those utilized in a corporate environment.

All of the above takes on even greater importance when taken in the context of the use of video games to educate or train people. Such training practices are gaining traction as schools and businesses begin to appreciate the power of using a video game environment to engage learners and train them to work their way through a decision-filled process. However, users undergoing training are even more in need of effective help functions than those who play for pleasure, as the users undergoing training are probably novices at using the video game, and their training time may be either paid work time or may be part of an educational requirement. Thus, it is imperative that such users be able to navigate through a video game software program efficiently on their own.

SUMMARY

Embodiments of the present invention provide a computer software program help feature. The help employs a two-tiered approach for assisting the user, comprising both event-generated help and context-sensitive help. Event-generated help provides initial assistance to the user and is provided without request from the user. Context-sensitive help provides additional and supplemental assistance that can serve as a reminder or prompt at any point during the use of the software program. Context-sensitive help must be requested by the user. The two types of help work in tandem, and at least one of the event-generated help and context-sensitive help is available to the user at all times.

In at least some embodiments, the help feature comprises an icon and text presented on-screen to the user.

In at least some embodiments, the help is employed in a video game software program.

In at least some embodiments the event-generated help is automatically presented the first time the user launches the video game or encounters the main screen of the video game. The event-generated help displays text welcoming the user and explaining how to begin playing the game. The event-generated help may be presented in the form of a help avatar and may include help text that explains to the user what to do next. The program provides for user input to close the event-generated help when it is no longer needed.

In at least some embodiments the event-generated help is presented each time the user triggers a new event in the video game, wherein an event may be defined as any part, portion or segment of the game. The event-generated help displays a text explanation of how to play that part, portion or segment of the game. The event-generated help may be presented in the form of a help avatar and may include help text. The program provides for user input to close the event-generated help when it is no longer needed.

In at least some embodiments the context-sensitive help is represented by an icon located in a bottom corner of the screen, out of the way of game play. The user may continue to play the game, and at any point the user can click on the icon for help at the particular game stage the user is currently engaged in. The context-sensitive help can prompt the user to take the next action or can remind the user of where he or she was in the game play.

In some embodiments, the invention is implemented via either a stand-alone instruction execution platform or such a platform interconnected with other platforms or data stores by a network, such as a corporate intranet, a local area network, or the Internet. A computer program product or computer program products contain computer programs with various instructions to cause the hardware to carry out, at least in part, the methods and processes of the invention. Data sets may include lists of "events" matched with help text and lists of stages of game play ("contexts") matched with help text. Data sets may include lists of historical high game scores or other game data, such as a user's history of scores. Data sets may be stored locally or accessed over a network.

BRIEF DESCRIPTION OF THE DRAWINGS

FIGS. 1A-1D present examples of event-generated help and context-sensitive help that may be seen when a new game is initiated.

FIG. 2 presents examples of event-generated help and context-sensitive help that may be seen relating to the rear servicing screen ATM component.

FIG. 3 presents examples of event-generated help and context-sensitive help that may be seen relating to the receipt printer ATM component.

FIG. 4 presents examples of event-generated help and context-sensitive help that may be seen relating to the cash dispenser ATM component.

FIG. 5 presents examples of event-generated help and context-sensitive help that may be seen relating to the bulk note acceptor ATM component.

DETAILED DESCRIPTION OF THE INVENTION

Figure 1A:
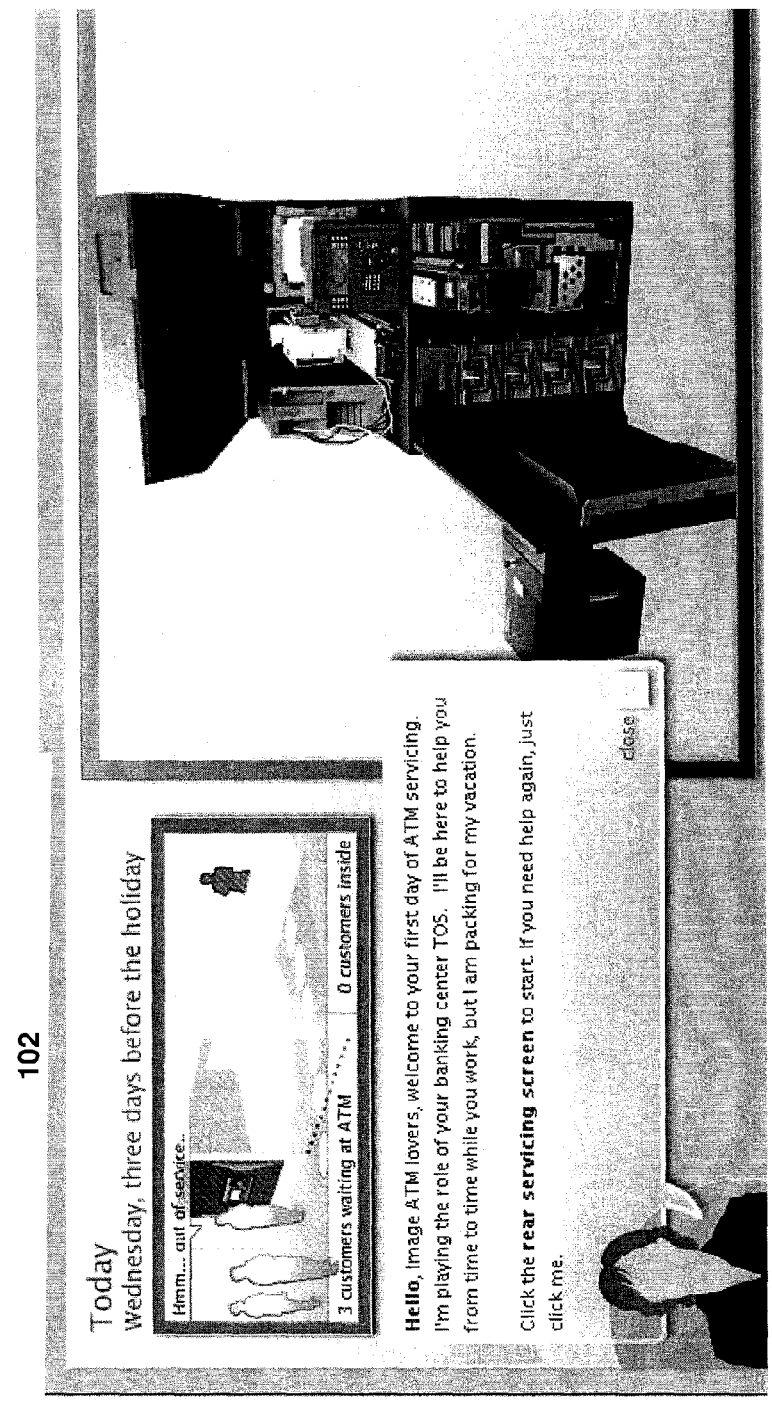
FIGS. 1A-1D present example screen shots of user screens for the help feature.

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

Embodiments of the present invention provide a computer software program help feature. The help employs a two-tiered approach to helping the user, comprising both event-generated help and context-sensitive help. Event-generated help provides initial assistance to the user and is provided without request from the user. Context-sensitive help provides additional and supplemental assistance that can serve as a reminder or prompt at any point during the use of the software program. Context-sensitive help must be requested by the user. The two types of help work in tandem to provide support for the user.

Event-generated help is help that appears automatically when a new event is initiated within the computer software program. An "event" is defined by the author of the computer software program and may be any part, portion or segment of the program so designated. The parts, portions, or segments of the program designated to be "events" give rise to an automatic offering of event-generated help when an event is initiated by the user of the program. Each event is associated with help text that is presented on-screen to the user when the event is initiated.

Context-sensitive help is help that is available to the user of the computer software program upon request. The context-sensitive help remains inactive until requested by the user. "Context" is defined by the author of the computer software program and may be employed at whatever level of detail the author chooses. Context may be provided in view of the program's events, or may be otherwise defined according to any stage or occurrence of the program. Each context, as defined by one of ordinary skill in the art, is associated with help text that is presented on-screen to the user if the user requests help while within the context. One of ordinary skill in the art would easily be able to determine effective ways of defining "event" and "context" within the computer software program.

At least one of event-generated help and context-sensitive help is always available to the user of the program. Further, the event-generated help and context-sensitive help work in tandem. Working "in tandem" refers to the fact that there is an interplay between the two types of help, so that not only is at least one of them always available to the user, but also the type of help available is appropriate and unique to the user's place in the program. For example, when the user first initiates an event, automatic event-generated help is presented with text that addresses the event in progress. When the user is in the midst of a portion of the program, the context-sensitive help is unobtrusively available upon request. As the user progresses through different parts of the program, the type of help offered automatically adjusts so that it is current and appropriate to the situation.

The following description is based on an exemplary implementation of an embodiment of the invention in a video game for use in educating bank employees, such as tellers, to fix and maintain an automated teller machine (ATM). ATMs are high maintenance pieces of equipment, in that they require at least weekly attention for settlement of transactions, replenishment of cash reserves and to ensure that the receipt printer has paper. Further, it is not uncommon for other issues affecting ATM functionality to arise between weekly maintenance sessions, such as problems with the loaded cash (i.e., wrong orientation, or torn or folded bills) or with the receipt printer (paper gets jammed, torn, or runs out). Still further, the ATM may have other difficulties, such as failures by the Bulk Note Acceptor (BNA) as a result of jammed bills. Banks require the ability to address these issues in a timely manner, as non-functioning ATMs cause customer dissatisfaction and bank profit losses. Therefore, an educational video game useful for training bank employees in how to maintain ATMs is an attractive and viable option for banks.

The help feature of the present invention is particularly well suited for video game training that occurs in a busy environment, such as a bank. Tellers may be required to undergo training by playing the game in a work environment where their game play is almost certain to be interrupted due to work duties such as attending to customers. However, the invention is useful in any software program in which there is a desire to offer guidance and assistance to the user.

In summary, and as an exemplary embodiment, the ATM "Fix, Maintain, or Meltdown™" video game is described in more detail as follows. The object of the game is to fix ATM faults (defined more fully below), or problems, before the banking center line extends out the door with presumably unhappy customers. Based on fault information presented on the ATM servicing screen (also called the rear servicing screen), the user must examine different ATM components in order to identify and correct faults. Corrective action may be taken to "fix" each fault. Exemplary faults include, for example, unfit currency loaded into the ATM, or a receipt printer that has run out of paper. Corrective action may consist of calling an ATM support vendor to fix faults that the bank employee is not equipped to fix. If the line at the banking center extends out the door, the game is lost. Once the game is lost, the user must start over.

The "fixes" are actions that the user can take to correct ATM faults, and are offered to the user via buttons on the screen. Thus, the game provides guidance by offering a limited number of options for correcting each fault.

The ATM "Fix, Maintain, or Meltdown™" video game is a single-player game that is made up of increasingly difficult rounds of "mini-games", each of which is an "event" as described above. In each mini-game, the virtual ATM machine is configured to have "faults". Faults are ATM features that are in need of either a maintenance action or a repair action. The successive mini-games increase in difficulty due to a decreasing amount of help available during each game, as well as decreasing amounts of time in which to complete the repair and maintenance tasks. The game forces the user to navigate through the maintenance and repair process based on an ability to recognize faults and an understanding of when to make the fix themselves and when to call the ATM support vendor for help. The game further imposes a time-sensitive environment in which the fixes must be undertaken, so that the user is forced to prioritize fault fixes in order to succeed in the game.

Two types of faults are utilized in the game. "Emerging" faults are features that do not put the ATM component out of commission immediately as opposed to "immediate" faults, which are features that cause the ATM component to stop performing as soon as they are present. For example, a bunch of strapped bills located at the front of a cash cassette is treated as an immediate fault because the ATM cannot pick a bill from a bunch of strapped bills. Once the ATM attempts to pick the a bill from the strap of bills and fails, no more bills can be picked from that cash cassette until the user intervenes and provides appropriate individual bills at the front of the cash cassette. If the bunch of strapped bills is located in the middle of the cash cassette, the game treats the situation as an emerging fault as the cash cassette will perform its intended function until the ATM attempts to pick from the strap of bills.

For purposes of the training game, the ATM is divided into multiple components, each of which may require maintenance or repair attention. The ATM components that may be addressed in the game include the cash dispenser, which is made up of multiple cash cassettes; the bulk note acceptor; and the receipt printer. There is an additional available fault that may occur when ATM components, such as cash cassettes and receipt printers, are not returned to their original position in the ATM after an action has been performed on them.

Each component may present faults during the game that are representative of what might be encountered when fixing or maintaining a real-life ATM. The cash dispenser is usually made up of several cash cassettes, which are accessed in succession as needed by the ATM. The cash dispenser is one of the most common sources of ATM faults. Cash dispenser faults may include a cassette with unfit currency up front, cash loaded in the wrong orientation, incorrect denominations of bills loaded, straps not removed from packs of bills, or bills not fanned and separated before being placed in the cash cassette. The cash cassettes may also simply run out of bills before the scheduled routine weekly maintenance and may need to be replenished.

The receipt printer is another source of common ATM faults. The receipt printer may run out of paper, the paper may be improperly installed, the wrong type of receipt paper may be loaded, or the paper may become jammed or in some other way be prevented from feeding the printed receipt out to the customer.

Other ATM faults that the user may encounter include hardware failures or a bill jam located in the bulk note acceptor. Note that anytime the user wants to examine a component, the component must be "unseated". Unseating may require, for example, opening up the component, such as opening up the cash dispenser and pulling out each individual cassette in order to examine the contents. Any component that the user unseats must be reseated before the maintenance or repair is complete and successful. If the user does not reseat the component, a fault will result.

To provide further training to the employee learning how to maintain and repair an ATM, the game further includes a feature wherein the user loses the game immediately if the user tries to repair an ATM feature that he or she should not touch, such as the BNA. ATMS are very expensive (current prices are in the tens of thousands of dollars), and banks do not want untrained employees to inappropriately try to address maintenance and repairs of specialized and expensive equipment. Such maintenance and repair issues should be left to support personnel provided by the ATM vendors. One purpose of the game is to help the user distinguish between repairs and maintenance he or she can perform unaided (thus reducing both the number of costly service calls to the ATM vendor support personnel and the amount of time the machine is non-operational) and repairs that should be left to the ATM vendor support personnel (thus protecting costly ATM components from damage by inexperienced and unknowledgeable bank employees). If the user tries to unseat an "off-limits" component, the ATM "melts down" (is destroyed) in dramatic fashion and the user immediately loses the game.

The user's final score is determined by taking into account the amount of time that has passed during maintenance and repair actions taken by the user, as well as the user's success in recognizing and correcting both immediate and emerging faults. If too much time passes, customers will move from standing in line at the ATM to standing in line inside the banking center. If the customer line inside the banking center becomes so long that it extends out the door, the game ends and the user cannot perform any further actions, even if there are still faults outstanding.

User success within the "ATM: Fix, Maintain, or Meltdown™" video game occurs due to user recognition and correction of immediate faults, user recognition and correction of emerging faults, and user efficiency in avoiding unnecessary actions. Users accumulate points for correction of both immediate and emerging faults. However, users are penalized for "taking too long" to make repairs by customer transfers from the line at the ATM to the line inside the banking center. When a customer transfers from the line at the ATM to the line inside the banking center, the user accumulates penalty points. A user's final game score is determined by calculating an additive total of points earned in fixing immediate and emerging faults, and then subtracting the penalty points from the additive total. Thus, users cannot earn points unless they make appropriate repairs. However, users who take unnecessary actions thereby accumulate penalty points which are subtracted from the points earned in making fixes when the final score is calculated.

Following is a description of a series of screen shots of user screens presented during the video game help feature according to example embodiments of the invention. It is understood that the user screen shots provided herein are intended as examples of how the help feature may be presented during a video game and are not meant to be limiting. One of skill in the art would understand that many different presentations of the help feature are possible.

FIGS. 1A-1D present screen shots of user screens for the video game help feature according to example embodiments of the invention. In this example, the help feature is implemented using the functionality of Adobe Flash™. Event-generated help 106 (FIG. 1C) is compared to context-sensitive help 108 (FIG. 1D) for the main screen of the "ATM Fix, Maintain, or Meltdown™" video game. The main screen is presented when a game is initiated. In the "ATM Fix, Maintain, or Meltdown™" video game, the help features are presented to the user as pop-up boxes that are placed just to the left of the game screen 102 (FIG. 1A).

Figure 1B:
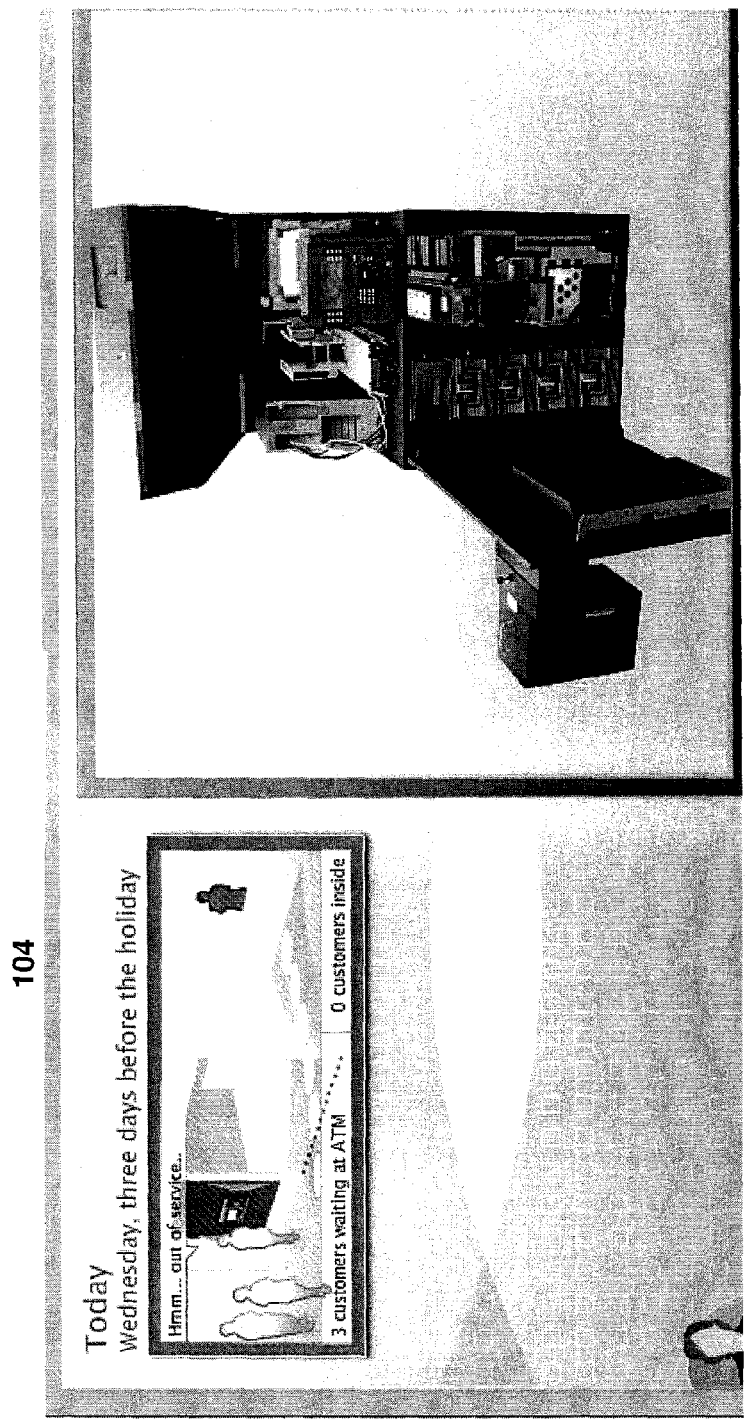
Figure 1C:
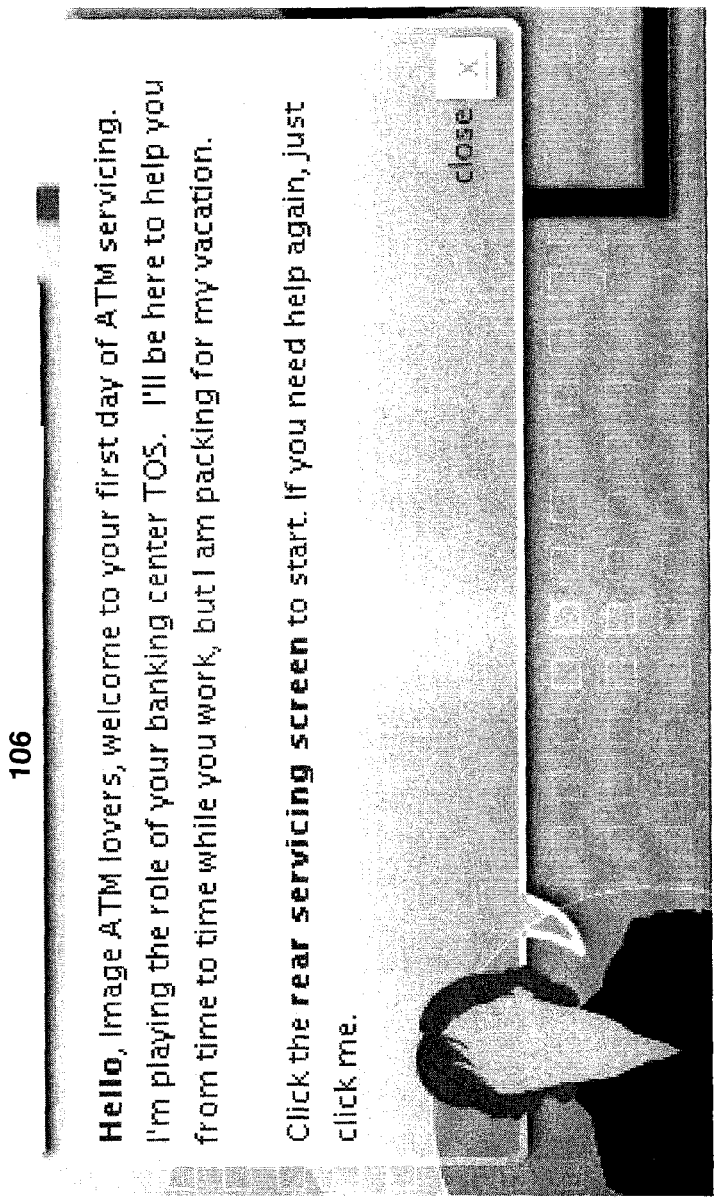
Figure 1D:
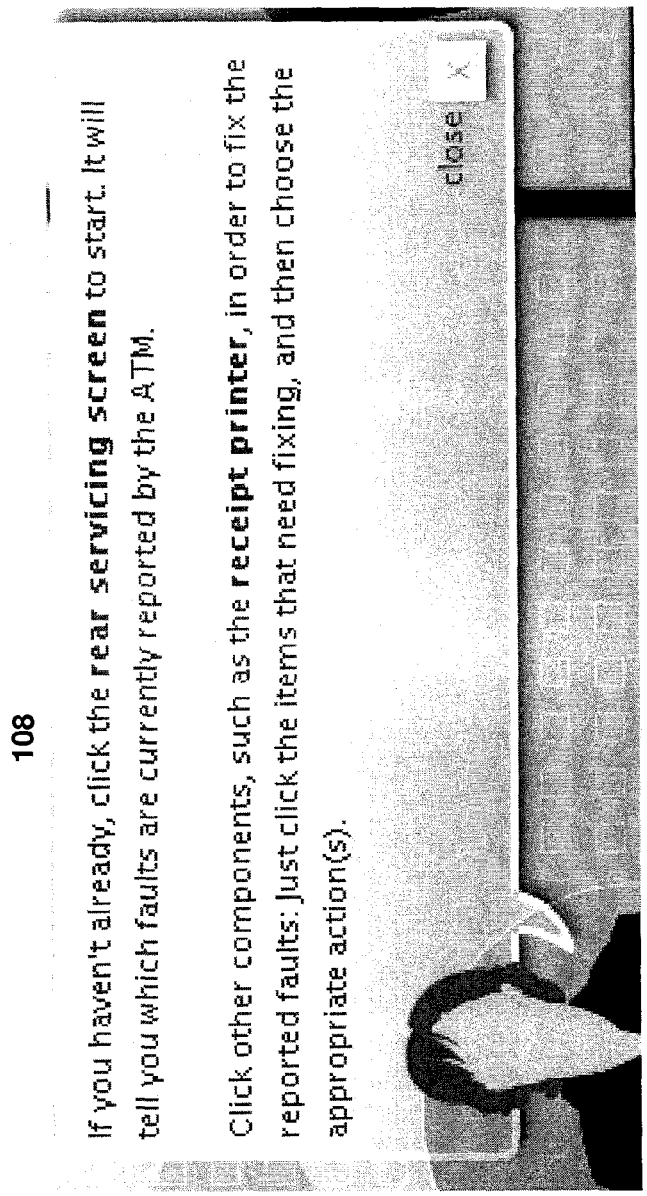

The event-generated help screen 102 (full screen) and 106 (zoomed in to focus on help feature) presents a help icon in the shape of a woman with no facial features who represents the "TOS" (teller operation specialist, or senior teller). Sometimes such an icon, in the form of a human, is referred to as an avatar. The help text welcomes the user and explains how to begin the game. The help screen 102 or 106, with icon and text, is automatically presented to the user upon initiation of the ATM game. The help feature provides for user input to close the help by clicking on the "X" in the lower right corner of the help box. If the "X" is clicked, the help text will fade from the screen and the help icon will diminish in size and remain unobtrusively in the lower left corner of the screen 104 (FIG. 1B).

The context-sensitive help screen 108 appears only if the user requests help by clicking on the help icon in the lower left corner of the screen 104. When the user clicks on the help icon, the icon enlarges and becomes a pop-up box with text 108 explaining the game in progress and/or prompting the user as to what to do next. This can be an especially effective form of help if the user has been interrupted during game play and has come back to the game after a time lag. Once the user is finished with the context-sensitive help box, he or she can click the "X" in the lower right corner of the help box to minimize the help box and continue playing the game.

Figure 2:
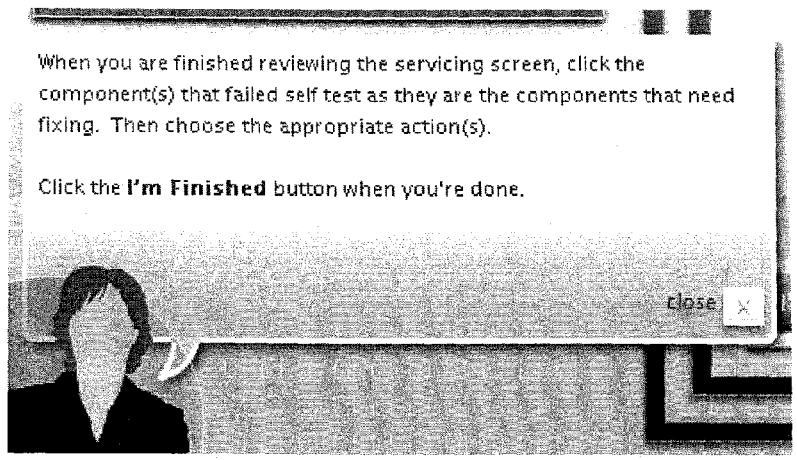
FIG. 2 presents example screen shots of user screens for the help feature.
Figure 2:
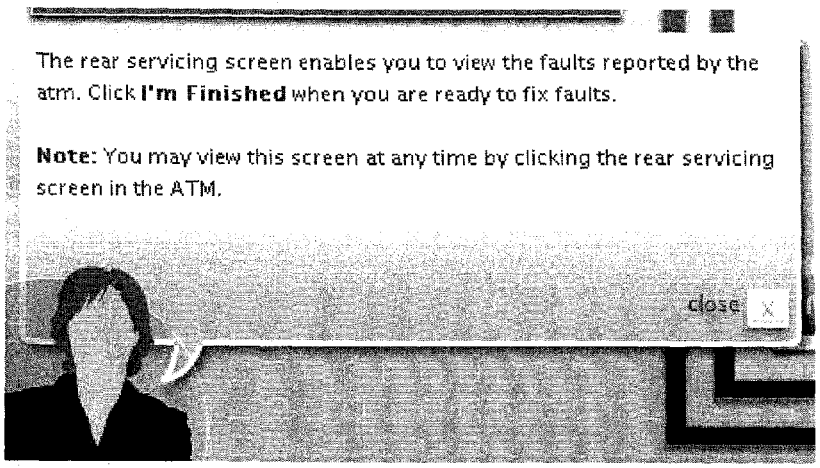

FIG. 2 presents screen shots of user screens for the video game help feature according to example embodiments of the invention. In this example, the help feature is implemented using the functionality of Adobe Flash™. Event-generated help 202 is compared to context-sensitive help 204 for the rear finishing screen of the "ATM Fix, Maintain, or Meltdown™" video game.

In the event-generated help screen 202, the help icon appears along with text that explains how to navigate the rear servicing screen. The help screen 202 is automatically presented to the user when the user initially clicks on, or activates, the rear servicing screen during game play. Once the user is finished with the event-generated help box, he or she can click the "X" in the lower right corner of the help box to minimize the help box and begin or continue playing the game.

The context-sensitive help screen appears only if the user requests help by clicking on the help icon in the lower left corner of the screen. When the user clicks on the help icon, the icon enlarges and becomes a pop-up box with text 204 explaining the game in progress and/or prompting the user what to do next. Once the user is finished with the context-sensitive help box, he or she can click the "X" in the lower right corner of the help box to minimize the help box and continue playing the game.

Figure 3:
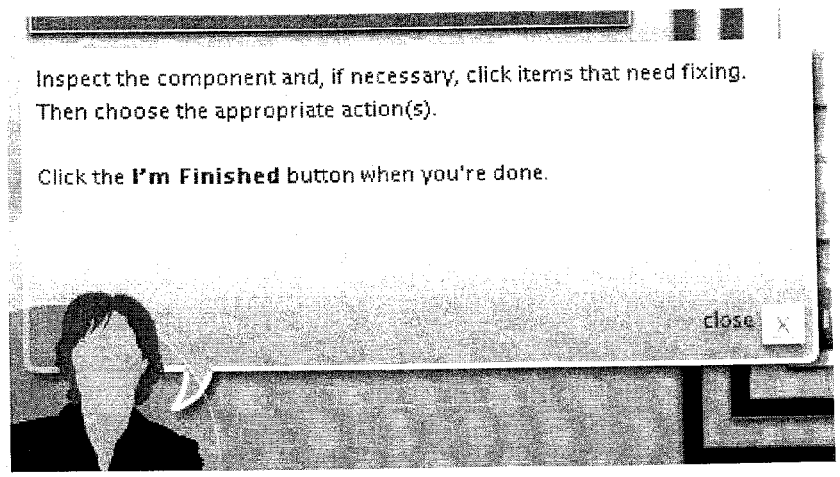
FIG. 3 presents example screen shots of user screens for the help feature.
Figure 3:
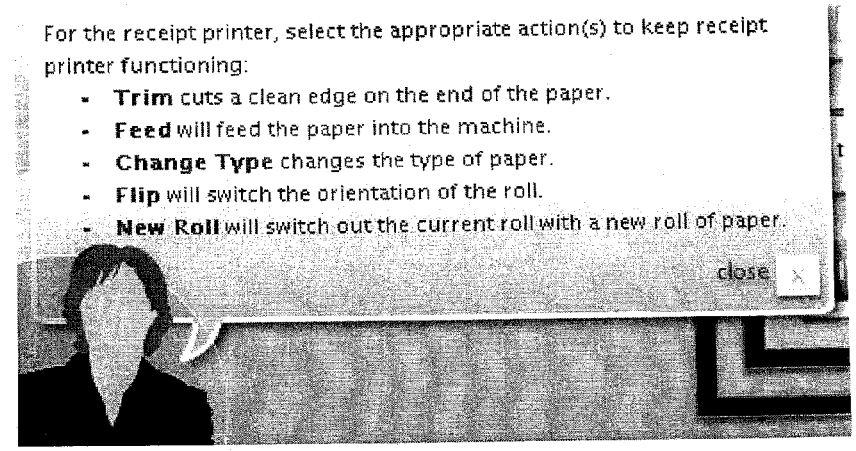

FIG. 3 presents screen shots of user screens for the video game help feature according to example embodiments of the invention. In this example, the help feature is implemented using the functionality of Adobe Flash™. Event-generated help 302 is compared to context-sensitive help 304 for the receipt printer component of the "ATM Fix, Maintain, or Meltdown™" video game.

In the event-generated help screen 302, the help icon appears along with text that explains how to inspect and fix the ATM components. The help screen 302 is automatically presented to the user the first time the user clicks on, or activates, any of the ATM components during game play, including the receipt printer, the cash cassettes, or the bulk note acceptor. Once the user is finished with the event-generated help box, he or she can click the "X" in the lower right corner of the help box to minimize the help box and continue playing the game.

In contrast to the event-generated help provided for the ATM components, which is a general guide prompting the user as to what action to take next, the context-sensitive help provided for the ATM components is specific and unique to each component. The context-sensitive help screen appears only if the user requests help by clicking on the help icon in the lower left corner of the screen. When the user clicks on the help icon, the icon enlarges and becomes a pop-up box with text 304 explaining the game in progress and/or prompting the user what to do next. The context-sensitive help 304 provides detailed descriptions of the ATM receipt printer fixes offered in the game. These descriptions assist the user in understanding the fix selections offered, thereby providing insight as to under what circumstances each one would be appropriately applied.

Figure 4:
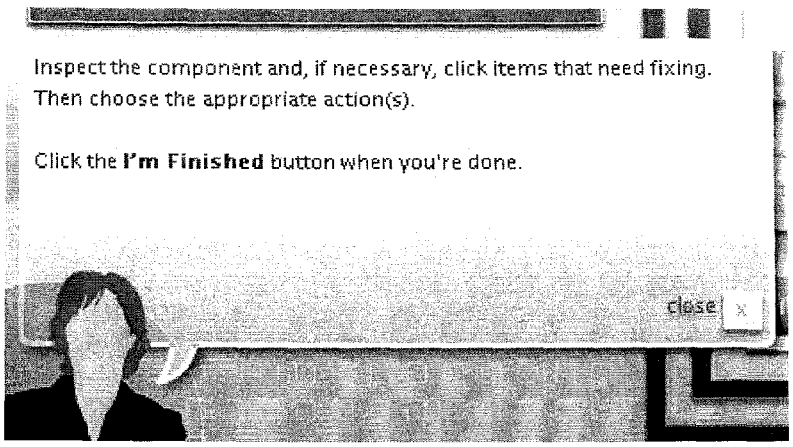
FIG. 4 presents example screen shots of user screens for the help feature.
Figure 4:
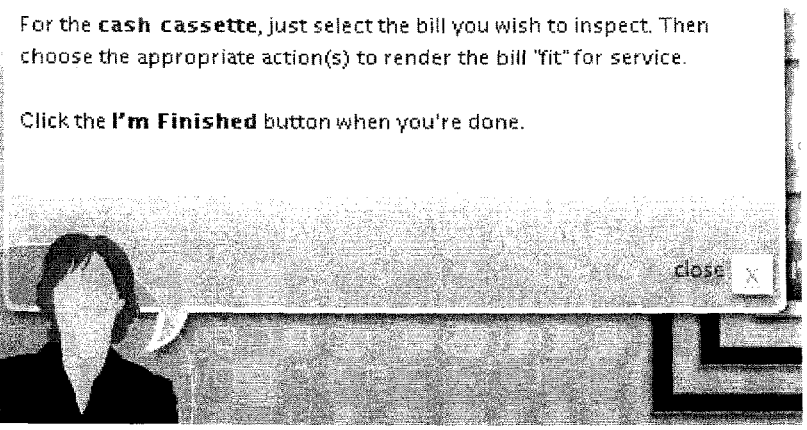

FIG. 4 presents a screen shot of a user screen for the video game help feature according to example embodiments of the invention. In this example, the help feature is implemented using the functionality of Adobe Flash™. Event-generated help 402 is compared to context-sensitive help 404 for the cash cassette component of the "ATM Fix, Maintain, or Meltdown™" video game. Note that the event-generated help screen that corresponds to the cash cassette component is the same as that presented in FIG. 3 for the receipt printer component 302.

The context-sensitive help screen 404 appears only if the user requests help by clicking on the help icon in the lower left corner of the screen. When the user clicks on the help icon, the icon enlarges and becomes a pop-up box with text 404 explaining the game in progress and/or prompting the user what to do next. The context-sensitive help 404 provides a description of how to fix ATM cash cassette faults in the game.

Figure 5:
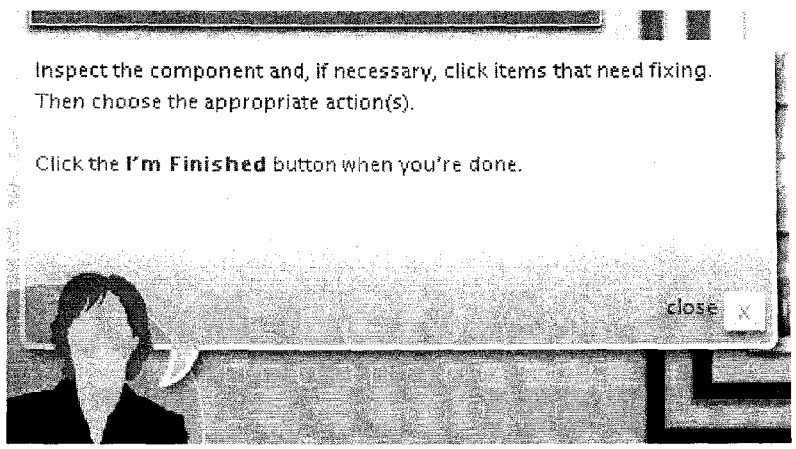
FIG. 5 presents example screen shots of user screens for the help feature.
Figure 5:
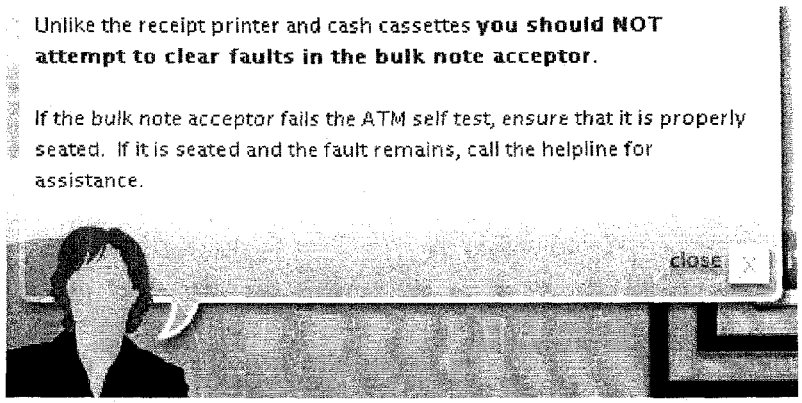

FIG. 5 presents a screen shot of a user screen for the video game help feature according to example embodiments of the invention. In this example, the help feature is implemented using the functionality of Adobe Flash™. Event-generated help 502 is compared to context-sensitive help 504 for the bulk note acceptor component of the "ATM Fix, Maintain, or Meltdown™" video game. Note that the event-generated help screen that corresponds to the bulk note acceptor component 502 is the same as that presented in FIG. 3 for the receipt printer component 302.

The context-sensitive help screen 504 appears only if the user requests help by clicking on the user icon in the lower left corner of the screen. When the user clicks on the help icon, the icon enlarges and becomes a pop-up box with text 504 explaining the game in progress and/or prompting the user what to do next. The context-sensitive help 504 provides a description of how to fix ATM bulk note acceptor faults in the game. This can be an especially effective form of help if the user has been interrupted during game play and has come back to the game after a time lag. In this example, the help feature is useful for emphasizing that the user should NOT attempt to clear faults in the bulk note acceptor. This is a valuable implementation of the help feature, as it serves to reinforce the importance of this training section and helps to prevent misguided repair attempts on real ATMs.

Figure 6:
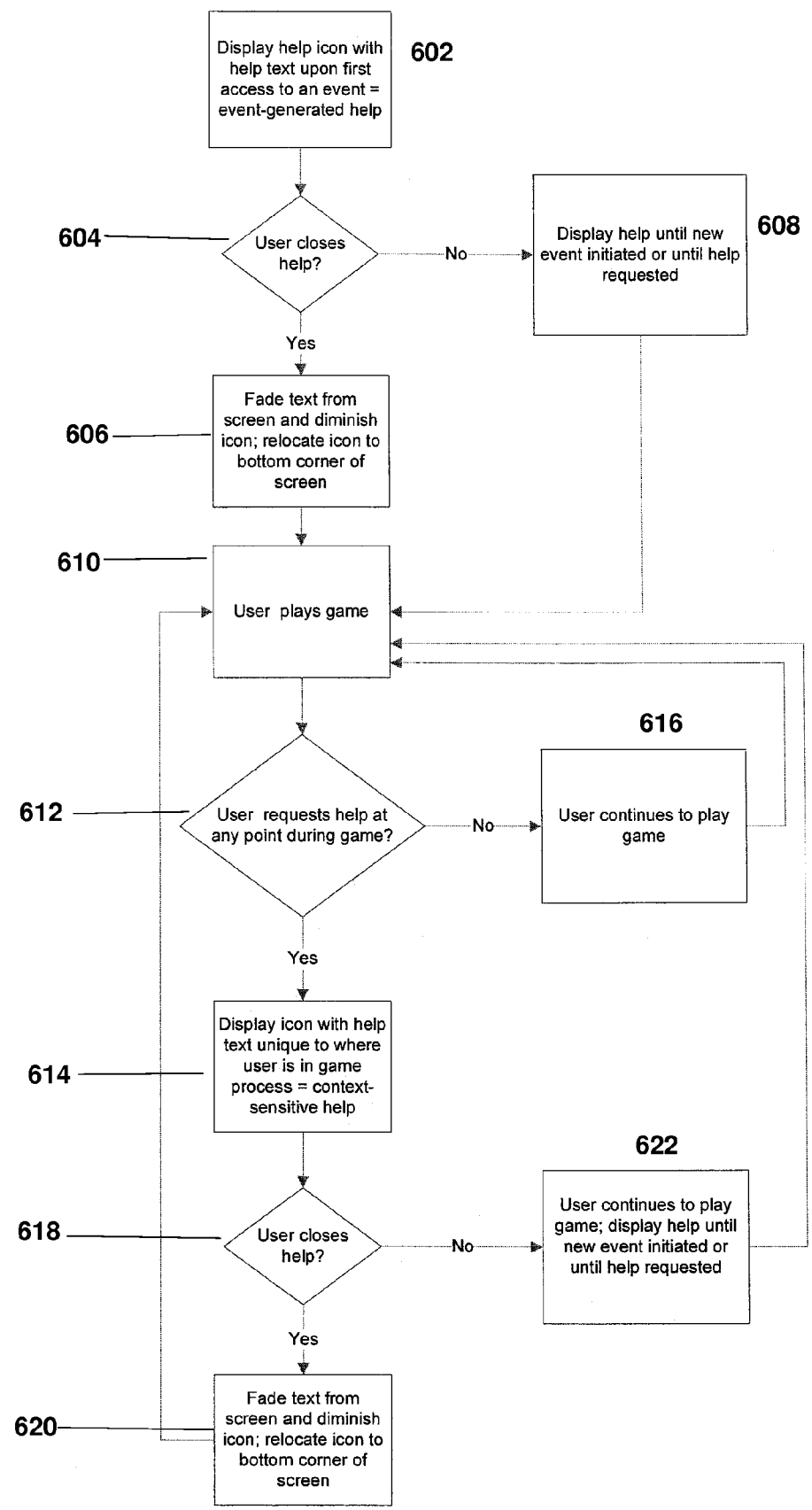
FIG. 6 is a flowchart that illustrates a method of using the help feature according to example embodiments of the invention.

FIG. 6 is a flowchart that illustrates an example embodiment of the present invention. The flowchart is organized as a series of process blocks. In particular, the flowchart presents an embodiment of the present invention utilized in an "ATM Fix, Maintain, or Meltdown™" video game. Upon initial access to an event, such as the main game screen when first entering the game, the event-generated help displays as a pop-up box on the screen at block 602. The event-generated help feature may contain both an icon as a friendly visual cue that represents a helpful presence, and text for providing information to the user about how to begin playing the game.

After the user is finished with the initial event-generated help, the user may choose whether to close the help pop-up box at block 604. The user may click an "X" in the event-generated help pop-up box to close the help or may simply click on an ATM component to begin playing the game. If the user chooses to close the help, clicking the "X" will cause the help text to fade from the screen, and the icon to reduce in size and relocate to a bottom corner of the screen at block 606. The user can then click an ATM component and play the game at block 610. If the user chooses not to close the help pop-up box, the user can proceed with playing the game and the pop-up box will remain until either a new event is initiated or help is requested at block 608. Help can be requested by clicking on the help icon. If a new event is initiated or help is requested, the help pop-up box will be updated so that the help offered is appropriate to whatever the current game situation is.

As game play continues, the user may encounter features or occurrences about which he or she has questions. At any time during game play, the user has the option of clicking on the help icon in the bottom corner of the screen and obtaining context-sensitive help. If the user does not need help, the user continues to play the game as at block 616. If the user requests help from the help icon at block 612, then the icon displays with context appropriate text instructions at block 614 related to whatever game event the user is currently engaged in. When the user is finished with the help, the user may choose at block 618 whether to click an "X" in the event-generated help pop-up box to close the help or whether to simply continue playing the game.

If the user chooses to close the help at block 618, clicking the "X" will cause the help text to fade from the screen, and the icon to reduce in size and relocate to a bottom corner of the screen at block 620. The user can then click an ATM component and play the game at block 610. If the user chooses not to close the help pop-up box at block 622, the user can proceed with playing the game and the pop-up box will remain until either a new event is initiated or help is requested. Help can be requested by clicking on the help icon. If a new event is initiated or help is requested, the help pop-up box will be updated to present help appropriate to whatever the current game situation is. The help is available to the user for the entire time the game is being played.

Figure 7:
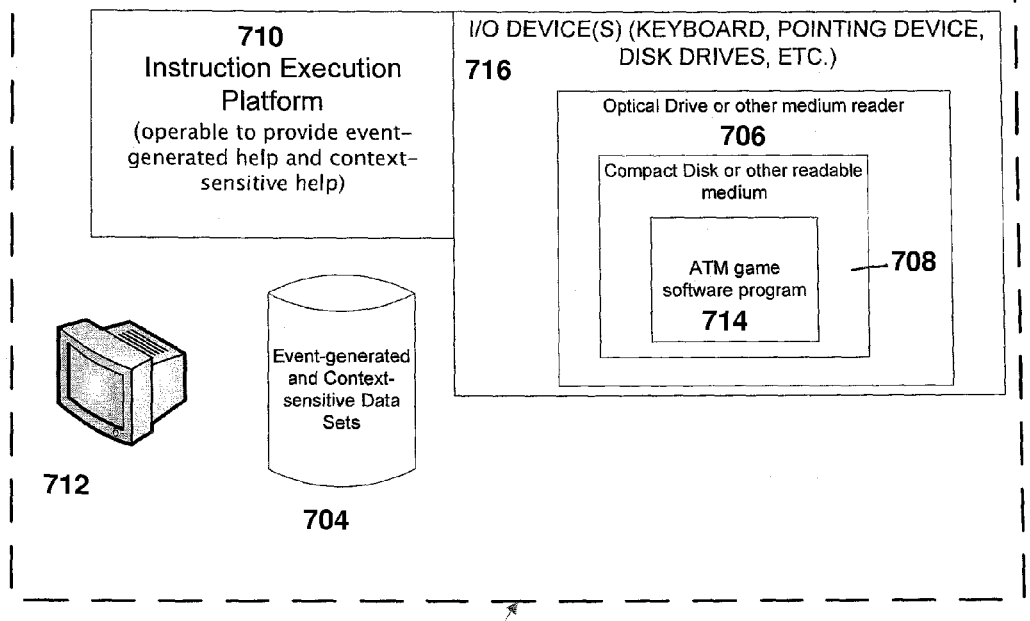
FIG. 7 is a system block diagram according to example embodiments of the invention.
Figure 7:
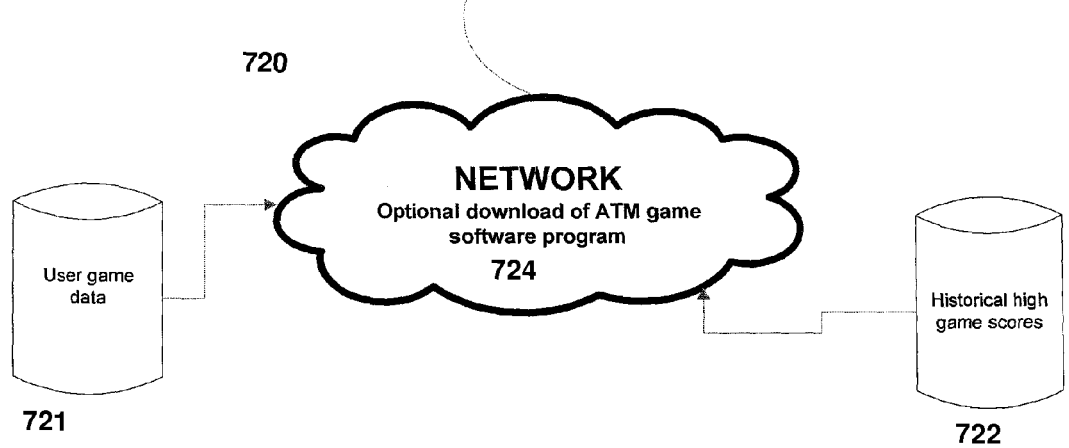

FIG. 7 is a system block diagram according to example embodiments of the invention. FIG. 7 actually illustrates two alternative embodiments of a system implementing the invention. System 702 can be a workstation or personal computer. System 702 can be operated in a "stand-alone" mode. The system includes a fixed storage medium, illustrated graphically at 704, for storing programs and/or macros which enable the use of an embodiment of the invention. In a stand-alone implementation of the invention, fixed storage 704 can also include the data sets which are necessary to implement an embodiment of the invention. In this particular example, the input/output devices 716 include an optical drive 706 connected to the computing platform for loading the appropriate computer program product into system 702 from an optical disk 708. The computer program product includes a computer program or programs with instructions or code for carrying out the methods of the invention. Instruction execution platform 710 of FIG. 7 includes a microprocessor and supporting circuitry and can execute the appropriate instructions and display appropriate screens on display device 712.

FIG. 7 also illustrates another embodiment of the invention in which case the system 720 which is implementing the invention includes a connection to data stores, from which user data and historical high game scores can be retrieved, as shown at 721 and 722, respectively. The connection to the data stores or appropriate databases can be formed in part by network 724, which can be an intranet, virtual private network (VPN) connection, local area network (LAN) connection, or any other type of network resources, including the Internet. Data sets can be local, for example on fixed storage 704, or stored on the network, for example in data store 721 or 722.

A computer program which implements all or parts of the invention through the use of systems like those illustrated in FIG. 7 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the computing and video game arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

The invention claimed is:

1. A method of providing on-screen assistance to a user of a video game program for teaching how to maintain and repair an ATM, comprising:
   presenting to the user faults associated with an ATM, wherein the faults comprise immediate faults and emerging faults;
   providing event-generated help;
   providing context-sensitive help, wherein the event-generated help and the context-sensitive help act in tandem; and
   determining a game score, wherein the game score is determined at least in part by the user's success in fixing immediate faults and emerging faults.

2. The method of claim 1, wherein at least one of the group consisting of event-generated help and context-sensitive help comprises an icon and text.

3. The method of claim 1, wherein the event-generated help is automatically presented to the user upon initiation of a new event.

4. The method of claim 1, wherein the context-sensitive help is represented by an onscreen icon that can be activated at any time during game play by the user.

5. The method of claim 4, wherein the context-sensitive help, when activated by the user, addresses the context of a part of the game the user is currently engaged in.

6. The method of claim 1, wherein the program provides for user input to close at least one of the group consisting of event-generated help and context-sensitive help.

7. The method of claim 6, wherein at least one of the group consisting of event-generated help and context-sensitive help comprises an icon and text, and wherein the text fades from the screen and the icon reduces in size and moves to a corner of the screen when the user closes the help.

8. The method of claim 1, wherein the ATM has a plurality of components.

9. The method of claim 1, wherein the at least one fault associated with the ATM comprises at least one fix the user may input to remedy the at least one fault.

10. The method of claim 1, wherein the game score is additionally determined at least in part by the amount of time the user utilizes to fix immediate faults and/or emerging faults.

11. The method of claim 10, wherein the user is penalized for utilizing more than a predetermined amount of time to fix an immediate fault and/or emerging fault.

12. The method of claim 1, wherein the ATM comprises at least one component that is off-limits to the user.

13. The method of claim 12, wherein the user automatically loses the video game if the user attempts to interact with a component that is off-limits.

14. A non-transitory computer readable medium for providing on-screen assistance to a user of a video game program for teaching how to maintain and repair an ATM, the computer readable medium including computer program code comprising:
   instructions for presenting to the user faults associated with an ATM, wherein the faults comprise immediate faults and emerging faults;
   instructions for providing event-generated help;
   instructions for providing context-sensitive help, wherein the event-generated help and the context-sensitive help act in tandem; and
   instructions for determining a game score at least in part by the user's success in fixing immediate faults and emerging faults.

15. The computer readable medium of claim 14, wherein at least one of the group consisting of event-generated help and context-sensitive help comprises an icon and text.

16. The computer readable medium of claim 14, wherein the event-generated help is automatically presented to the user upon initiation of a new event.

17. The computer readable medium of claim 14, wherein the context-sensitive help is represented by an on-screen icon that can be activated at any time during game play by the user.

18. The computer readable medium of claim 17, wherein the context-sensitive help, when activated by the user, addresses the context of a part of the game the user is currently engaged in.

19. The computer readable medium of claim 14, wherein the program provides for user input to close at least one of the group consisting of event-generated help and context-sensitive help.

20. The computer readable medium of claim 19, wherein at least one of the group consisting of event-generated help and context-sensitive help comprises an icon and text, and wherein the text fades from the screen and the icon reduces in size and moves to a corner of the screen when the user closes the help.

21. The computer readable medium of claim 14, wherein the ATM has a plurality of components.

22. The computer readable medium of claim 14, wherein the at least one fault associated with the ATM comprises at least one fix the user may input to remedy the at least one fault.

23. The computer readable medium of claim 14, wherein the game score is additionally determined at least in part by the amount of time the user utilizes to fix immediate faults and/or emerging faults.

24. The computer readable medium of claim 23, wherein the computer program code further comprises instructions for penalizing the user for utilizing more than a predetermined amount of time to fix an immediate fault and/or emerging fault.

25. The computer readable medium of claim 14, wherein the ATM comprises at least one component that is off-limits to the user.

26. The computer readable medium of claim 25, wherein the computer program code further comprises instructions for automatically ending the video game if the user attempts to interact with a component that is off-limits.

27. A system for providing on-screen assistance to a user of a video game program for teaching how to maintain and repair an ATM, the system comprising:
   an instruction execution platform operable to
      present to the user faults associated with an ATM, wherein the faults comprise immediate faults and emerging faults;
      provide event-generated help and context-sensitive help, wherein the event-generated help and the context-sensitive help act in tandem; and
      compute a game score, the game score being determined at least in part by the user's success in fixing immediate faults and emerging faults; and
   a data set comprising lists of events matched with event-generated help text and lists of contexts matched with context-sensitive help text, the data set being disposed to be accessed by the instruction execution platform.

28. An apparatus for providing on-screen assistance to a user of a video game program for teaching how to maintain and repair an ATM, the apparatus comprising:

means for presenting to the user faults associated with an ATM, wherein the faults comprise immediate faults and emerging faults;

means for providing event-generated help;

means for providing context-sensitive help, wherein the event-generated help and the context-sensitive help act in tandem; and means for determining a game score, wherein the game score is determined at least in part on the user's success in fixing immediate faults and emerging faults.

* * * * *